April 28, 1964  N. B. MEARS  3,130,473
SCREEN GRID FOR POWER TUBES AND METHOD OF MAKING THE SAME
Filed Sept. 17, 1962  2 Sheets-Sheet 1
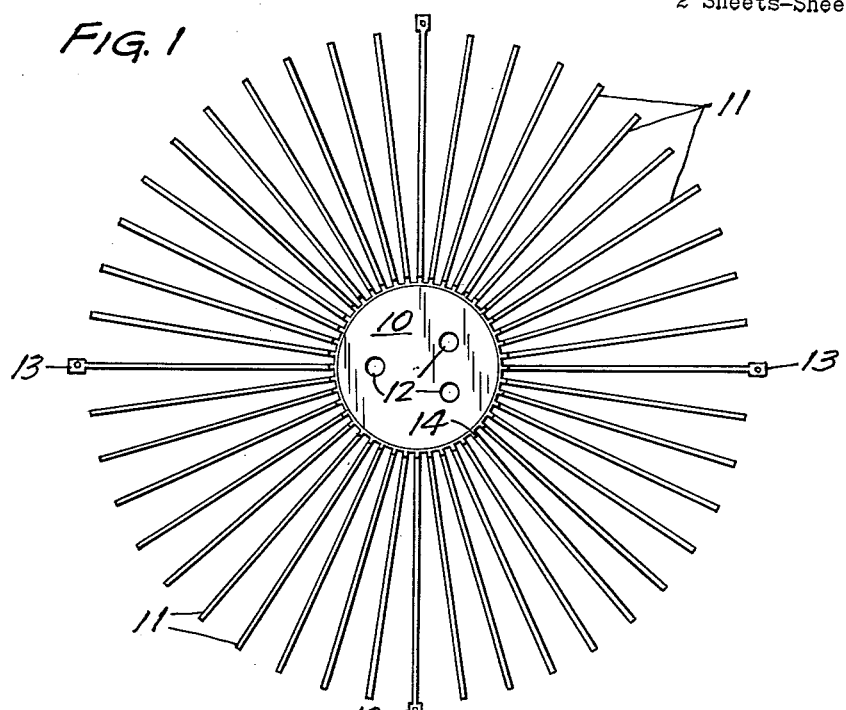
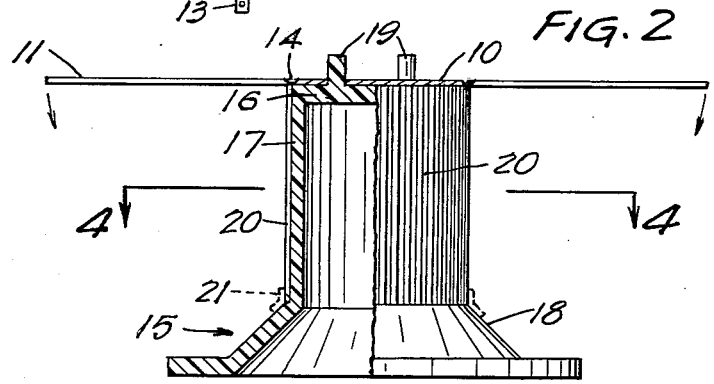
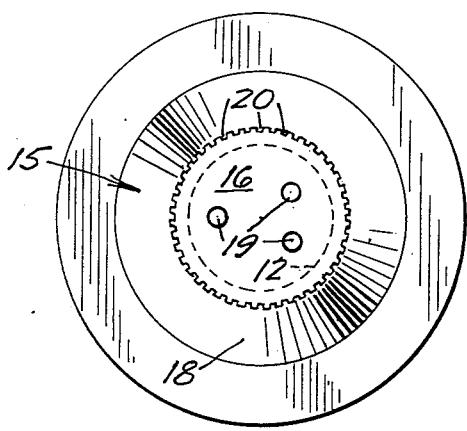
INVENTOR
NORMAN B. MEARS
BY
ATTORNEY April 28, 1964     N. B. MEARS     3,130,473
SCREEN GRID FOR POWER TUBES AND METHOD OF MAKING THE SAME
Filed Sept. 17, 1962     2 Sheets-Sheet 2
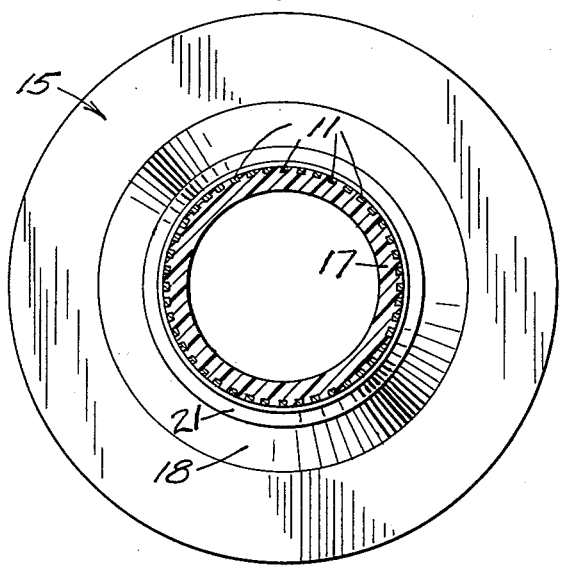
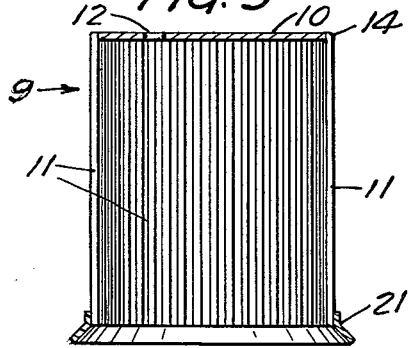
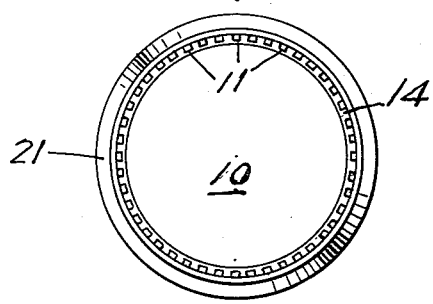
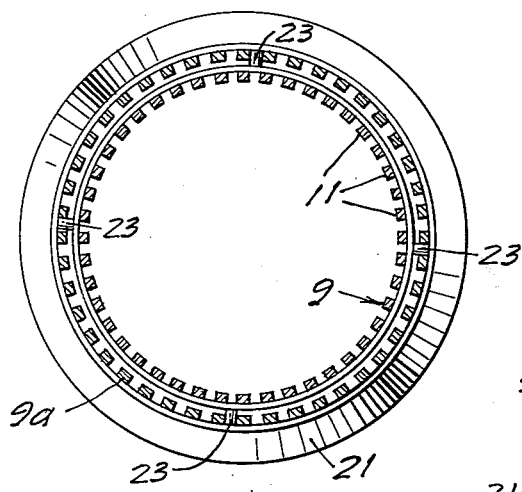
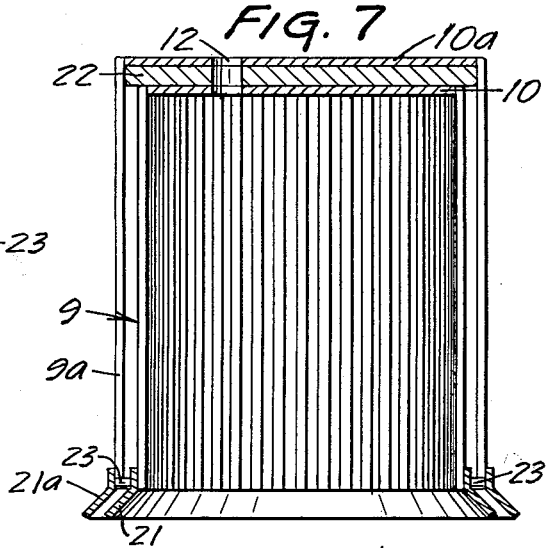
INVENTOR
NORMAN B. MEARS
BY John E. Strypher
ATTORNEY United States Patent Office 3,130,473
Patented Apr. 28, 1964

3,130,473
SCREEN GRID FOR POWER TUBES AND METHOD OF MAKING THE SAME
Norman B. Mears, Dakota County, Minn.
(1170 Dodd Road, St. Paul, Minn.)
Filed Sept. 17, 1962, Ser. No. 224,013
10 Claims. (Cl. 29—25.14)

This invention relates to improvements in screen grids for power tubes, and particularly to improvements in the screen grids and method of making them, described in my co-pending application, Serial No. 206,873, filed July 2, 1962, and of the type having telescoping inner and outer cup-shaped members, each including a multiplicity of grid bars extending longitudinally of a cylindrical wall which is radially spaced from a similar wall of a telescoping grid.

It is an object of the present invention to provide an improved method of making such screen grids whereby the cost of the grids is reduced and the quality is improved.

Another object is to provide a method of making such screen grids from metals having high tensile strength and high melting points for power tubes wherein the cathodes may reach temperatures on the order of 8000° C. or higher.

A further and particular object is to provide a method for making grids for power tubes which includes the steps of forming in plane metal sheet material, by photo-printing and etching procedures an end wall and radially extending grid bars, then bending and holding the bars so that they form a generally cylindrical cup shaped grid, and then connecting the ends of the bars remote from the end member to a metal ring, providing an annular base or mounting ring for supporting the grid cup.

The invention also includes certain other novel features of the grid structure and procedure for making the same which will appear and be more fully pointed out in the following specification and claims.

Referring to the drawings:

FIGURE 1 is a top plan view showing the end wall and radiating grid bars formed from a sheet metal blank;

FIG. 2 is a part side elevational view and part vertical sectional view showing the grid end wall and grid bars in place on a form upon which the grid may be shaped and held during the assembly with a supporting ring;

FIG. 3 is a top plan view of the cylindrical form;

FIG. 4 is a fragmentary horizontal sectional view, taken on a line 4—4 of FIG. 2 and with the grid bars in place in the form grooves and showing the mounting ring;

FIG. 5 is a vertical sectional view of one of the grid units with mounting ring, removed from the form;

FIG. 6 is a plan view of one of the grid units;

FIG. 7 is a vertical sectional view showing a pair of the finished grids in telescoping relation, one to the other, and FIG. 8 is a horizontal sectional view showing a pair of the finished screen grids in their normal telescoping relation.

Referring to FIGS. 1 and 2, each grid has a centrally located, circular end wall member 10 which is integral with a multiplicity of radially extending grid bars 11. These elements are shown in their co-planar position in which they are produced by photo-printing and etching treatment of a sheet metal blank.

Photo-printing and etching techniques suitable for producing the grid elements 10 and 11 are well known to those skilled in the art. A negative of the pattern defining the circular end wall 10 and radially extending grid bars 11 is prepared in conventional manner from a drawing and is used by exposure to actinic light to reproduce the pattern on a sheet metal blank of the required thickness. The blank may be prepared by coating one or both sides of the metal with a photo-resist enamel. For maximum accuracy, registering negatives of the pattern to be reproduced may be used in contact with opposite sides of a blank having photo-resist enamel coatings. The pattern is then developed to expose the areas to be etched, and by etching treatment over the exposed areas of the blank metal is removed to form the grid members 10 and 11. It will be evident that the selection of the etching solution is dependent on the particular metal from which the screen grid is to be formed. The etching may include the formation of apertures 12 extending through the wall 10 for use in accurately locating the grid on the form hereinafter described. Terminal tabs 13 integral with the outer ends of selected grid bars 11 may also be formed by etching, for subsequent use in making electrical connections with the grid bars. To facilitate the bending of the grid bars 11 at right angles to the end wall 10, a circular crease or bend line 14 may be formed at the junction of the end member and bars, by mechanical means or etching.

An inverted cup shaped form 15 is provided to receive and hold the end wall 10 and grid bars 11 during the subsequent assembling of the screen grid parts. This form has a circular end wall 16, a substantially cylindrical side wall 17, and a skirt portion 18, of dimensions and shape corresponding to those of the grid to be formed thereon. A plurality of locator pins 19 project upwardly from the upper surface of the wall 16 to enter the several apertures 12 formed in the grid wall 10. A multiplicity of parallel grooves 20, corresponding in number to the number of grid bars 11, are formed in the outer surface of the cylindrical wall 17 to receive the grid bars when they are bent to substantially right angular positions relative to the end wall 10.

The ends of the grid bars 11 remote from the end wall member 10 are connected to a metal ring 21 which provides an annular base and mounting ring for supporting the grid cup. The connection between the ring 21 and ends of the grid bars may be formed by heat fusion, soldering or brazing, for example. Accurately uniform location and spacing of the grid bars 11 is obtained by bending them at the crease line 14 downwardly into the several grooves 20 in the form 15. After the several grid bars have been pressed into the grooves 20, the ring 21 may be slipped over the exterior of the form 15 and grid bars, and moved down to a position such as that indicated in broken lines in FIG. 2. A rigid connection between the ring 21 and the lower end portions of the several grid bars is finally made, as indicated.

The resulting cup-shaped grid indicated generally at 9 may be removed from the form 15 for assembly in telescoping relation to a similar grid 9a or may be retained on the form for assembly with an outwardly spaced grid 9a. The grid 9a is of slightly larger diameter and may be placed on the same form 15 and accurately located with respect to the grid 9 by using the locator pins 19 in apertures 12 of the outer grid 9a.

As indicated in FIGS. 7 and 8, the inner and outer grid cups 9 and 9a may be spaced apart by means of a disc 22 of ceramic material inserted between the end wall members 10 and 10a and two or more spacers 23 of similar material may be placed between the mounting rings 21 and 21a of the inner and outer grid cups to retain the grid bars 11 and 11a of the telescoping units in the required radially spaced relation. To insure accurate positioning of the inner and outer grid cups, the locator pins 19 are of such length as to project through apertures in the spacer 22 and apertures like the apertures 12 formed in the end wall member 10a of the outer grid 9a.

My method of forming the grid bars and end walls of each cup-shaped screen grid from a unitary sheet of metal greatly reduces the cost of making them and makes it feasible to form them from any metal that may be shaped by etching. This method lends itself to mass production and the use of automatic equipment for photo-printing, developing and etching the end wall members and grid bars from continuous rolls of metal of any required thickness within the range .003 inch to .05 inch thick. Examples of automatic equipment suitable for forming the prinicipal elements of the grid cups are described in the following identified patents:

No. 2,710,591, granted June 14, 1955, Machine for Producing Light-sensitive Coatings on Metal Webs, No. 2,710,814, granted June 14, 1955, Method for Producing Light-sensitive Coatings on Metal Webs, No. 2,720,146, granted October 11, 1955, Photo-printing Apparatus, No. 2,751,829, granted June 26, 1956, Machine for Developing Photo-printed Coatings on Metal Webs, No. 2,762,149, granted September 11, 1956, Method and Apparatus for Producing Perforated Metal Webs, No. 2,814,975, granted December 3, 1957, Photo-printing Apparatus, No. 2,791,514, granted May 7, 1957, Apparatus and Method for Coating Elongated Webs with Light-sensitive Material, No. 2,822,635, granted February 11, 1958, Apparatus and Method for Etching Metal Webs.

Screen grids in present production are formed from a sheet metal blank which is approximately .01 inch thick and the grid bars are bent to space them uniformly approximately .01 inch apart. Screen grids made according to present invention have advantages over prior art of standard screen grids which are similar to those obtained from electro-formed grids made according to my co-pending application, Serial No. 206,873. These include substantial increase in the electron emission from the tube cathode contained in the screen grid, greater heat resistance, and more efficient dissipation of heat.

The present invention has the further advantage in that sheets of the metals or alloys of molybdenum, tungsten, or other metals that cannot be electro-formed may be etched to form grids having maximum heat resistance combined with great strength in thin sections.

I claim:

1. A method of making a screen grid of cup shape comprising:
    (a) forming from a sheet metal blank a centrally located end wall member and a multiplicity of grid bars of substantially uniform cross sectional size integral with and radiating from the periphery of said end wall member;
    (b) bending and holding said bars so that they extend in substantially parallel relation one to the others in the shape of a tubular grid at one side of said end member, and
    (c) connecting the ends of said bars remote from said end member to a metal ring, providing an annular base for supporting the grid.

2. A method of making a screen grid in accordance with claim 1 in which said sheet metal blank is of substantially uniform thickness within the range .003 inch to .05 inch, said central end member and grid bars are formed by etching away the segments of said blank between said bars.

3. A method of making a screen grid in accordance with claim 1 including the step of reducing the thickness of said blank along a crease line defining the junction of said end member and bars.

4. A method of making a screen grid in accordance with claim 1 in which said sheet metal blank is of substantially uniform thickness within the range .003 inch to .05 inch and said grid bars are bent to space them uniformly apart a dimension approximately equal to the thickness of said blank.

5. A method of making a screen grid in accordance with claim 1 in which said sheet metal blank is approximately .01 inch thick and said grid bars are bent to space them uniformly approximately .01 inch apart.

6. A method of making a screen grid in accordance with claim 1 including the step of providing a form having a substantially cylindrical outer surface and a multiplicity of circumferentially spaced parallel grooves in said cylindrical surface disposed to locate the several grid bars when they are bent, said form having an outer end surface corresponding in size and shape to said end member; and in which said end member is placed on said outer end surface of said form and the several grid bars are placed in the several substantially parallel grooves of said form.

7. A method of making a screen grid in accordance with claim 6 which includes the step of interengaging protrusions on said outer end surface of said form with apertures in said end member of said black for locating said end member and grid bars in a predetermined position in which said bars are aligned with said grooves in said form.

8. A method of making screen grids having inner and outer spaced telescoping cup-shaped units comprising:
    (a) forming from a sheet metal blank a first centrally located end member and a multiplicity of grid bars of a first series integral with and radiating from the periphery of said end member;
    (b) placing said end member and grid bars on a substantially cylindrical form and bending said bars to extend in parallel relation one to the others along a cylindrical surface of said form;
    (c) connecting the ends of said bars remote from said end member to a first metal ring, providing an annular base for supporting a first screen grid unit of cup-shape;
    (d) forming from a second sheet metal blank a second end member of larger diameter and a multiplicity of grid bars equal in number to the bars of the first series radiating from the periphery of said second end member;
    (e) placing and bending the grid bars of the second series on a second cylindrical form of larger diameter than the first form;
    (f) connecting the ends of said grid bars of the second series remote from the second end member to a second ring of diameter substantially equal to that of the second end member to complete a second screen grid unit;
    (g) placing said second screen grid unit exteriorly of said first screen grid in telescoping, spaced relation thereto; and
    (h) securing said first and second metal rings in spaced, concentric, electrically insulated relation one to the other.

9. A method of making screen grids in accordance with claim 8 which includes the insertion of ceramic dielectric spacers between said first and second end members and between the supporting rings of said first and second screen grid units.

10. A method of making screen grids in accordance with claim 8 which includes the provision of a plurality of locator pins projecting from the outer end surface of said first cylindrical form, apertures in said first and second end members disposed to receive said locator pins, and including the steps of removing said second screen grid unit from said second form, and placing both of said screen grid units in engagement with said locator pins for the assembly of said units on said first form.

References Cited in the file of this patent

UNITED STATES PATENTS 2,121,597    Karl _____ June 21, 1938